3,686,252
PREPARATION OF ORGANOSILICON COMPOUNDS WITH SILYLPHENYL GROUPS
André Bazouin, Luzinay, and Marcel Lefort, Caluire, France, assignors to Rhone-Poulenc S.A., Paris, France
No Drawing. Filed Aug. 7, 1970, Ser. No. 62,145
Claims priority, application France, Aug. 8, 1969, 6927361
Int. Cl. C07f 7/08
U.S. Cl. 260—448.2 P  5 Claims

ABSTRACT OF THE DISCLOSURE

Organosilicon compounds, useful in the production of oils, elastomers, rubbers and polysiloxane resins, of formula $$[Ar(R'_nSiCl_{3-n})_q]_pY$$

where Ar is aromatic radical, R' is hydrocarbyl, n and q are 1, 2 or 3 and Y is a valency bond or a p-valent radical, p is 1, 2 or more, are obtained by reacting $[Ar(SiR_3)_q]_pY$ with $R'_nSiCl_{4-n}$, R=alkyl, in the presence of aluminum chloride.

---

The present invention relates to a process for the conversion of organosilicon compounds with trialkylsilylphenyl groups into organosilicon compounds with phenylsilyl groups which may or may not contain Si-Cl bonds.

The present invention provides a process for the preparation of organosilicon compounds of the general formula $$[A_r(R'_nSiCl_{-n})_q]_pY \qquad (I)$$

wherein $A_r$ is a $(q+1)$-valent mononuclear aromatic radical having the valencies directly attached to the aromatic nucleus, R' is a saturated or unsaturated hydrocarbon radical, n and q are integers, identical or different, equal to 1, 2 or 3, Y is a valency bond or a monovalent or polyvalent radical of valency p; when p=1, Y is chlorine, hydrogen or a straight or branched alkyl, cycloalkyl, phenyl, alkylphenyl or phenylalkyl radical; when p=2, Y is a valency bond, a divalent hydrocarbon radical derived from aliphatic, cycloaliphatic, aromatic or aralkyl hydrocarbons, or a radical of formula $$-\underset{R''}{\underset{|}{Si}}-\left[ -Z-\underset{R''}{\underset{|}{Si}}- \right]_z-\qquad V$$

the radicals R'', which may be identical or different, being alkyl, cycloalkyl, aromatic or aralkyl radicals; Z being a divalent alkylene, cycloalkylene or arylene radical having less than 12 carbon atoms and z being an integer less than or equal to 20; and when p is greater than 2, Y is a radical of valency p derived from an aliphatic, cycloaliphatic, aromatic or aralkyl hydrocarbon, the process comprising reacting an organosilicon compound of general formula:

$$[A_r(SiR_3)_q]_pY \qquad (II)$$

in which the symbols R, which may be identical or different, are alkyl radicals with 1 to 4 carbon atoms, with an organochlorosilane of general formula $$R'_nSiCl_{(4-n)} \qquad (III)$$

in the presence of aluminium chloride.

Ar is preferably a hydrocarbon radical such as phenyl and o-, m- or p-phenylene radicals but can carry a substituent e.g. chlorine; R' may represent alkyl radicals such as methyl, ethyl, propyl, isopropyl, butyl or tert.-butyl, alkenyl radicals such as vinyl and allyl, cycloalkyl radicals, cycloalkenyl radicals, aryl radicals such as phenyl, aralkyl radicals or alkylaryl radicals.

Y preferably represents the valency bond, or a monovalent or divalent radical.

When p is equal to 1, the monovalent hydrocarbon radical Y is preferably an alkyl radical with 1 to 6 carbon atoms, a cycloalkyl radical with 5 to 6 carbon atoms, a phenyl radical or an alkylphenyl or phenylalkyl radical of which the alkyl portions have at most 6 carbon atoms. When p is equal to 2, the divalent hydrocarbon radical Y preferably represents an alkylene radical with 1 to 6 carbon atoms, a cyclohexylene radical or a phenylene radical. When Y is divalent radical (V)Z preferably represents an alkylene, cyclohexylene or phenylene group and R'' an alkyl radical with at most 6 carbon atoms.

Examples of compounds of Formula I which can be obtained in accordance with the process of the present invention include:

dimethyldiphenylsilane,
methyltriphenylsilane,
triphenylchlorosilane,
diphenylmethylchlorosilane,
dimethylphenylchlorosilane,
methylphenylvinylchlorosilane,
chlorophenyldimethylchlorosilane,
1-diphenylchlorosilyl-3,5-dimethylbenzene,
1,4-bis(dimethylchlorosilyl)-benzene,
4,4'-bis(dimethylchlorosilyl)-diphenyl,
4,4'-bis(methylphenylchlorosilyl)-benzene,
4,4'-bis(dimethylchlorosilyl)-diphenylmethane,
3,5,4'-tris(dimethylchlorosilyl)-diphenylmethane and
α,ω-dimethylchlorosilyl-dimethylsilphenylene of formula

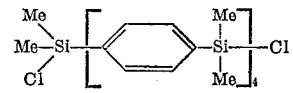

The reaction can be represented by the following equation:

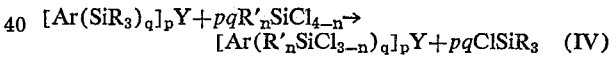

$$[Ar(SiR_3)_q]_pY + pqR'_nSiCl_{4-n} \rightarrow$$
$$[Ar(R'_nSiCl_{3-n})_q]_pY + pqClSiR_3 \qquad (IV)$$

The reagents can be used in any proportions. In general, an excess of organochlorosilane (III) is added relative to the stoichiometry of the reaction according to (IV). In practice, the amount of organochlorosilane (III) introduced is such that 1.5 qp to 8 qp mols of organochlorosilanes (III) are present per one molcule of the compound with a trialkylsilyl group (II). This aluminum chloride can be used in proportions by weight ranging from 0.1 to 10% and preferably from 0.5 to 5% relative to the total weight of the chlorosilanes introduced. It is preferred to use anhydrous aluminium chloride which has been stored in the form of coarse lumps and finely ground just before use.

The reagents and the catalyst may be heated in the liquid phase to a temperature of between 10 and 200° C. and preferably between 20 and 150° C. The reaction can be carried out under atmospheric pressure or under reduced pressure. In the latter case, the use of a reduced pressure makes if possible to work conveniently under reflux at a pre-selected temperature.

The reaction can be carried out in various ways, all of the reagents can be heated to the desired temperature until the reaction is complete or alternatively it is possible to introduce the organochlorosilane gradually into a flask which already contains the compound (II) and the aluminium chloride.

At the end of the heating period, when the reaction is complete, this can be checked by the content of trialkylchlorosilane formed, the constituents of the reaction mixture can be separated by any known method, for example, by fractional distillation. The fractions obtained may contain small amounts of organosilicon compounds, chlorinated to various degrees, in addition to the desired product of Formula I. The former can be separated off, either by a second rectification, or by any known chemical process, such as, for example, that described in French patent specification No. 1,466,546. It is also possible, if it is desired to remove more highly chlorinated impurities, to add small amounts of phosphoric acid and n-butanol to the mixture, which, by complexing the more highly chlorinated derivatives, make it possible to isolate the desired product in the pure state by distillations.

To avoid the aluminium chloride being carried over into the distillates with subsequent side reactions, it is advantageous to complex the catalyst in the final mixture. This can be done by adding a ketone, such as acetone, at a temperature of the order of, for example, 20 to 25° C. It is also possible to add an alkali metal halide, such as sodium chloride, to the final mixture and to heat the mixture briefly.

The reactants of Formula II can be synthesized by any known process, such as, for example, using magnesium compounds. Thus, a trialkylchlorosilane may be reacted with a magnesium derivative having chlorophenyl groups. Reactants II which may be used in the process of the invention include: trimethylphenylsilane, 4-diphenyl-trimethylsilane, p-tolyltrimethylsilane, 1,4-bis(trimethylsilyl)-benzene, 1-trimethylsilyl-3,5-dimethyl-benzene, m-chlorophenyltrimethylsilane, 4,4' - bis(trimethylsilyl) - diphenyl, 4,4'-bis(trimethylsilyl)-diphenylmethane, 3,5,4'-tris(trimethylsilyl) - diphenylmethane and 1,6 - bis(p-trimethylsilylphenyl)-hexane.

Reactants of Formula III which can be used in the process of the invention include: dimethylphenylchlorosilane, methylvinyldichlorosilane, methylphenyldichlorosilane, dimethyldichlorosilane, diphenyldichlorosilane and phenyltrichlorosilane.

The compounds of Formula I obtained in the process of the present invention, and especially those having Si—Cl bonds, are compounds which are very much used in industry. In view of their reactivity, they can be used for the production of oils, elastomers, rubbers and polysiloxane resins. In particular, they can be used to obtain derivatives with silphenylene units which yield heat-resistant resins and elastomers.

The by-product of the reaction, $ClSiR_3$, can be used as a chain stopping agent in polymerisation reactions.

The examples which follow illustrate the invention. Temperatures are in ° C.

EXAMPLE 1

75 g. trimethylphenylsilane, 258 g. of dimethyldichlorosilane and 6.7 g. of aluminium chloride are introduced into a 1000 cm.$^3$ flask and heated under reflux for 7 hours at 74°. After cooling, 4.5 g. of acetone are added and the mixture is stirred for 5 minutes and filtered so as to remove the aluminium chloride-acetone complex. 330 g. of reaction mixture are obtained and distilled under reduced pressure, giving 71 g. of a fraction $F_1$, boiling point$_{25}$=90.2–94.2°. 248 g. of a product containing about 75% of dimethyldichlorosilane and 24% of trimethylchlorosilane are collected in the traps. The fraction $F_1$ contain 89.7% of dimethylphenylchlorosilane (determined by chromatographic analysis). 0.4 g. of phosphoric acid and 5 g. of n-butanol are added to fraction $F_1$, heated to 100°. This mixture is kept at 100° for 10 minutes and thereafter a fraction of 50 g. of pure dimethylphenylchlorosilane (boiling point$_{15}$=83.8°) is recovered by distillation.

EXAMPLE 2

120 g. of trimethylphenylsilane, 565 g. of methylvinyldichlorosilane and 6.9 g. of aluminium chloride are introduced into a reaction flask and the reagents stirred for 3 hours at 30°. 4 g. of acetone are then added and the reaction mixture is filtered. Rectification under reduced pressure gives a 60 g. fraction, boiling point$_{20}$=20–30°, which contains 73% of methylphenylvinylchlorosilane. The yield is 30% relative to the trimethylphenylsilane and 50% relative to the methylvinyldichlorosilane.

EXAMPLE 3

A mixture of 75 g. of trimethylphenylsilane, 191.1 g. of methylphenyldichlorosilane and 5.2 g. of aluminium chloride is heated to 102° under atmospheric pressure for 3 hours 30 minutes. Thereafter 3.5 g. of sodium chloride are added and the reaction mixture is stirred for 10 minutes, cooled to ordinary temperature and filtered. Distillation under reduced pressure gives a 175.5 g. fraction boiling point$_{0.4}$=98°, containing 29.1% of diphenylmethylchlorosilane and 57% of phenylmethyldichlorosilane.

EXAMPLE 4

A mixture of 150 g. of trimethylphenylsilane, 506.5 g. of diphenyldichlorosilane and 13.1 g. of aluminium chloride is heated to 150° for 3 hours 30 minutes, and after cooling, 10 g. of acetone are added. On distillation, a 241 g. fraction boiling point$_{0.15}$=139–145°, is obtained, containing 77% of triphenylchlorosilane. Taking into account the reagents recovered, the yields of triphenylchlorosilane are respectively 65% relative to the trimethylphenylsilane and 40.5% relative to the diphenyldichlorosilane.

EXAMPLE 5

A mixture of 150 g. of trimethylphenylsilane, 313.5 g. of phenyldimethylchlorosilane and 9.2 g. of aluminium chloride is heated to 107–108° for 7 hours 45 minutes. After cooling, the reaction mixture is treated with 6.5 g. of acetone and is filtered. Rectification of the filtrate gives a 134 g. fraction boiling point$_{0.5}$=110–125°, containing 96% of diphenyldimethylsilane. The yields, expressed relative to each of the reagents introduced, are about 80%.

EXAMPLE 6

92.5 g. of ortho-chlorophenyltrimethylsilane, 258.2 g. of dimethyldichlorosilane and 7 g. of aluminium chloride are introduced into a flask and heated to 74° under atmospheric pressure for 5 hours. After adding 4.5 g. of acetone and cooling, 358 g. of a product are recovered; this is distilled and gives a 93 g. fraction $F_1$=boiling point$_{22}$=104–115°, containing 94.6% of chlorophenyldimethylchlorosilane.

EXAMPLE 7

82.1 g. of para-methylphenyltrimethylsilane, 258 g. of dimethyldichlorosilane and 6.8 g. of aluminium chloride are heated to 74° for 6 hours 45 minutes. After cooling, 5.2 g. of acetone are added and the reaction mixture is filtered. Distillation of the filtrate gives a 84 g. fraction boiling point$_{24}$=109–111°, containing 62.3% of para-methylphenyldimethylchlorosilane.

EXAMPLE 8

A mixture of 1500 g. of 1,4-bis(trimethylsilyl)-benzene, 10,270 g. of dimethyldichlorosilane and 200 g. of aluminum chloride is heated under reflux for 6 hours, and after cooling 330 g. of acetone are added. Distillation under reduced pressure gives a 1287 g. fraction, boiling point $_{0.5}$=115–120°, containing 88% of 1,4-bis(dimethylchlorosilyl)-benzene. Rectification of this fraction gives a 1060 g. fraction, boiling point $_{1.5}$=122.4–125.8°, containing 93% of 1,4-bis(dimethylchlorosilyl)-benzene (determined by chromatography and by nuclear magnetic resonance).

EXAMPLE 9

255 g. of methylphenyldichlorosilane and 3 g. of aluminum chloride are introduced into a flask. The mixture is heated to 70° at 15 mm. of mercury pressure and a toluene solution containing 150 ml. of toluene and 74 g. of 1,4-bis(trimethylsilyl)-benzene is run in over the course of 37 minutes. After cooling, 10 g. of acetone are added, the reaction mixture is filtered and the filtrate is subjected to distillation. A 266 g. fraction $F_1$=boiling point $_{0.6}$=20–88° and containing 62 g. of trimethylchlorosilane and 74 g. of methylphenyldichlorosilane and a distillation residue of 138 g. containing 70% of 1,4-bis(dimethylchlorosilyl)-benzene are obtained.

EXAMPLE 10

A mixture of 16 g. of 4,4′-bis(trimethylsilyl)-diphenylmethane, 40 g. of dimethyldichlorosilane and 1 g. of aluminum chloride is heated under reflux (72°) for 2 hours. After cooling, 5 g. of acetone are added, the reaction mixture is filtered, and the filtrate is distilled under reduced pressure. A 40 g. fraction, boiling point $_{0.5}$=20–80°, containing 16 g. of trimethylchlorosilane, and a distillation residue of 16 g. containing a 50% of 4,4′-bis(dimethylchlorosilyl)-diphenylmethane (as determined by nuclear magnetic resonance) are obtained.

EXAMPLE 11

A toluene solution containing 174 g. of toluene and 125 g. of α,ω-trimethylsilyldimethylsilphenylene of formula:

is heated to 80° for 2 hours in the presence of 5 g. of AlCl$_3$ and 52 g. of dimethyldichlorosilane. After cooling to 20°, 10 g. of acetone are added, the reaction mixture is filtered, and the filtrate distilled to remove all of the trimethylchlorosilane and toluene. A 129 g. solid residue containing 10.0% of chlorine and corresponding to the following formula:

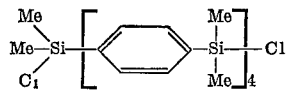

remains.

We claim:

1. A process for the preparation of an organosilicon compound of the general formula $$[Ar(R'_nSiCl_{3-n})_q]_pY$$

wherein $q$=1 or 2, Ar is an aromatic radical of valency $q+1$ which when $q$=1 is an o-, m- or p-phenylene radical, and when $q$=2 is a

radical, R′ is a straight or branched chain alkyl group of 1 to 4 carbon atoms, an alkenyl radical having up to 4 carbon atoms, a cycloalkyl or cycloalkenyl radical having 5 or 6 ring carbon atoms or a phenyl, alkylphenyl or phenylalkyl radical, the alkyl residues containing 1 to 4 carbon atoms $n$ represents 1, 2 or 3

$p$=1 and Y represents hydrogen, chlorine, an alkyl radical of 1 to 4 carbon atoms, a cycloalkyl radical having 5 or 6 ring carbon atoms or a phenyl radical or $p$=2 and Y represents a valency bond or an alkylene radical having 1 to 6 carbon atoms, a cycloalkylene radical having 5 or 6 ring carbon atoms or a phenylene radical or a radical of the formula

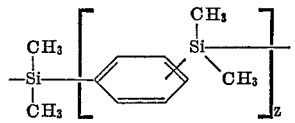

where $z$ is an integer less than or equal to 20 the process comprising reacting an organosilicon compound of general formula:

$$[Ar(SiR_3)_q]_pY$$

in which the symbols may independently be alkyl radicals of 1 to 4 carbon atoms, and Ar, $q$, $p$ and Y are as defined above, with an organochlorosilane of general formula $$R'_nSiCl_{(4-n)}$$

where R′ and $n$ are as defined above, in the presence of aluminium chloride.

2. A process according to claim 1, wherein the quantity of organochlorosilane employed is 1.5 to 8 times the molar quantity theoretically required for the reaction.

3. A process according to claim 1, wherein the amount of aluminium chloride employed is 0.1 to 10% by weight of the organochlorosilane employed.

4. A process according to claim 1, wherein the reaction mixture is heated at 10–200° C. under atmospheric or reduced pressure.

5. A process according to claim 1, wherein at the end of the reaction, acetone is added to the reaction mixture to complex the aluminum chloride.

References Cited

Noll: "Chemie und Technologie der Silicone," Verlag Chemie, Weinheim/Bergstr (1960), p. 46.

Banzant et al.: "Organosilicon Compounds," vol. 1, Academic Press Inc., N.Y. (1965), pp. 238–239.

TOBIAS E. LEVOW, Primary Examiner

P. F. SHAVER, Assistant Examiner

U.S. Cl. X.R.

260—46.5 G, 46.5 P, 448.2 E